United States Patent [19]
Frisk

[11] Patent Number: 6,132,825
[45] Date of Patent: *Oct. 17, 2000

[54] STERILANT DEGRADING POLYMERIC MATERIAL

[75] Inventor: Peter Frisk, Chicago, Ill.

[73] Assignee: Tetra Laval Holdings & Finance, SA, Pully, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/690,241

[22] Filed: Jul. 12, 1996

[51] Int. Cl.$^7$ ............................................... B29D 22/00
[52] U.S. Cl. ............................................................ 428/35.7
[58] Field of Search ........................... 524/435; 428/35.7, 428/35.8, 36.8

[56] References Cited

U.S. PATENT DOCUMENTS

| | | |
|---|---|---|
| 3,281,497 | 10/1966 | Joo et al. . |
| 3,828,833 | 8/1974 | Smith et al. . |
| 3,962,189 | 6/1976 | Russin et al. ............................ 252/428 |
| 4,230,663 | 10/1980 | Forstrom et al. ......................... 422/33 |
| 4,235,265 | 11/1980 | Feliks . |
| 4,331,491 | 5/1982 | Shaw et al. . |
| 4,368,081 | 1/1983 | Hata et al. .................................. 134/2 |
| 4,533,576 | 8/1985 | Tanahashi et al. ......................... 428/35 |
| 4,547,536 | 10/1985 | Nabors ..................................... 523/514 |
| 4,569,869 | 2/1986 | Kushida et al. ........................... 428/35 |
| 4,756,882 | 7/1988 | Jacobs et al. .............................. 422/23 |
| 4,767,804 | 8/1988 | Willoughby . |
| 4,937,055 | 6/1990 | Kittler et al. ......................... 427/126.3 |
| 5,037,684 | 8/1991 | Dundas et al. . |
| 5,077,258 | 12/1991 | Phillips et al. . |
| 5,152,900 | 10/1992 | Sekiguchi et al. ....................... 210/644 |
| 5,166,311 | 11/1992 | Nichols .................................... 528/285 |
| 5,235,010 | 8/1993 | Giovando ................................. 526/113 |
| 5,270,002 | 12/1993 | Neff, II et al. . |
| 5,342,673 | 8/1994 | Bowman et al. . |
| 5,346,733 | 9/1994 | Dalgewicz, III et al. . |
| 5,373,971 | 12/1994 | Laffy et al. . |
| 5,405,880 | 4/1995 | Kimura et al. . |
| 5,409,983 | 4/1995 | Jones et al. . |
| 5,417,908 | 5/1995 | Enggasser et al. ...................... 524/706 |
| 5,489,022 | 2/1996 | Baker . |
| 5,554,373 | 9/1996 | Seabrook et al. . |
| 5,609,837 | 3/1997 | Cerny et al. ............................. 422/301 |

FOREIGN PATENT DOCUMENTS

| | | |
|---|---|---|
| 0153894 | 9/1985 | European Pat. Off. . |
| 9618686 | 6/1996 | WIPO . |

*Primary Examiner*—Judy M. Reddick
*Attorney, Agent, or Firm*—Welsh & Katz, Ltd.

[57] ABSTRACT

A polymeric material integrated with a metal catalyst for promoting the degradation of a sterilants such as hydrogen peroxide and ozone. Examples of possible polymeric materials are PET, COPET and any mixture thereof. The polymer materials are usually configured into containers for aseptic processing. The metal catalyst may be selected from the group consisting of iron, cobalt, nickel, ruthenium, palladium, osmium, iridium, platinum, copper, manganese, salts thereof, oxides thereof and mixtures thereof. The metal catalyst is less than ten percent of the total weight of the modified polymeric material. The metal catalyst may be a plurality of nanosize particles or microsize particles. The metal catalyst may also be applied as a thin film onto a polymeric resin for absorption thereby. The sterilants usually become entrapped in amorphous zones of the polymeric material which results in higher than acceptable levels of sterilants in the containers. The novel polymeric material allows for application of a sterilant in the vapor phase, and substantially reduces the residence time of the sterilant as a container undergoes aseptic processing thereby expediting the aseptic process.

1 Claim, 5 Drawing Sheets

FIG. 5 ary refrigerating the food products. For example, conventionally packaged milk is usually stored at temperatures of 4 or 5° C. whereas aseptic packaging allows for storage at room temperature, 25° C. However, this energy savings is partially offset by the energy needed to heat flash off any residual sterilant which may become entrapped in or on the surface of the packaging material. In a monolayer container, a sterilant such as hydrogen peroxide may be present throughout the entire wall of the container. In a multilayer container, the hydrogen peroxide may only be present in a thin surface layer (less than 100 microns thick). In the case of hydrogen peroxide, very high temperatures must be achieved in order to remove any residual hydrogen peroxide. In addition to packaging of foods, aseptic containers can be used for packaging industrial materials in medical, electronic, chemical and mechanical fields such as# STERILANT DEGRADING POLYMERIC MATERIAL

TECHNICAL FIELD

The present invention relates to a sterilant degrading polymeric material and a method for producing the polymeric material. Specifically, the present invention relates to a sterilant degrading polyethylene terephthalate material utilized for aseptic containers and a method for producing the material.

BACKGROUND

In the food packaging industry, chemical sterilants are employed as bactericidal and sporicidal agents to sterilize food containers. These aseptic containers must have their food contact surfaces thoroughly sterilized to prevent spoilage or contamination of their contents. One of the most suitable chemical sterilants is hydrogen peroxide because of its degradation into oxygen and water, both of which are considered harmless in moderate quantities and which neither taint the food products or render them toxic. Although hydrogen peroxide has been used throughout the world for decades as a chemical sterilant in the aseptic packaging of shelf-stable foods such as milk, fruit juices, soft drinks and other liquid products, it wasn't until 1981 that the U.S. Food and Drug Administration approved its use in the U.S. for aseptic packaging. Foods packaged in hydrogen peroxide sterilized articles must comply with the appropriate FDA Good Manufacturing Practices which include: Part 108 for low acid and acidified foods; Parts 110 and 113 for low acid canned foods; and Part 114 for acidified foods. For example, under its regulations, the FDA set the level of hydrogen peroxide allowable in milk at the time of packaging at one hundred parts per billion, falling to one part per billion within a twenty-four hour time period.

Aseptic packaging is defined as the separate sterilization of the product and the packaging material. The packaging material is formed to a predetermined container configuration. The container is sterilized with a sterilant for a predetermined residence time, then the sterilant is removed from the aseptic container. If the sterilant is hydrogen peroxide at room temperature, then the residence time could be as much as thirty minutes for each container. The long residence time is one of the factors which increases the sterilization time for aseptic containers. The aseptic container is then filled with a desired contents such as milk or juice, and sealed under aseptic conditions. Well known examples of aseptic containers of this type are Tetra Brik® and Tetra Rex®.

One of the great benefits of aseptic packaging as opposed to conventional packaging is the substantial reduction in the use of energy to refrigerate the food products. For example, conventionally packaged milk is usually stored at temperatures of 4 or 5° C. whereas aseptic packaging allows for storage at room temperature, 25° C. However, this energy savings is partially offset by the energy needed to heat flash off any residual sterilant which may become entrapped in or on the surface of the packaging material. In a monolayer container, a sterilant such as hydrogen peroxide may be present throughout the entire wall of the container. In a multilayer container, the hydrogen peroxide may only be present in a thin surface layer (less than 100 microns thick). In the case of hydrogen peroxide, very high temperatures must be achieved in order to remove any residual hydrogen peroxide. In addition to packaging of foods, aseptic containers can be used for packaging industrial materials in medical, electronic, chemical and mechanical fields such as blood transfusion packs, semiconductor packages, oxidative chemicals packages, precision parts packages and the like. Thus, aseptic containers can be used in various forms in a wide variety of fields.

The packaging industry has failed to invent a way to remove the residual sterilant which would maintain the energy savings and reduce the time for sterilizing aseptic packaging materials. It therefore will be appreciated by those in the packaging industry that there is a substantial need for removal of the residual sterilant in manner that would save energy, reduce sterilizing time and would be cost effective. The present invention fulfills this need and provides other related advantages for the packaging industry.

SUMMARY OF THE INVENTION

The present invention meets the unfulfilled needs of the packaging industry by providing for the degradation of sterilants entrapped in the walls of the aseptic container itself at a substantial savings in energy, time and costs. The present invention is able to accomplish this by providing a novel aseptic container composed of an integrated polymeric material which inherently promotes the degradation of sterilants.

One aspect of the invention is embodied in a polymeric material integrated with a metal catalyst which promotes the degradation of sterilants such as hydrogen peroxide and ozone. The sterilants are often entrapped in the amorphous zones of the configured polymeric material. The polymeric material is usually polyethylene terephthalate ("PET"), a copolymer of polyethylene terephthalate ("COPET") or a mixture thereof. However, other polymer materials may be used for the present invention. The metal catalyst may be selected from the group consisting of iron, cobalt, nickel, ruthenium, palladium, osmium, iridium, platinum, copper, manganese, salts thereof, oxides thereof and mixtures thereof. The metal catalyst is usually less than ten percent of the total weight of the entire polymeric material, however greater weight percentages may be employed in practicing the present invention. The metal catalyst may be in the form of nanosize or microsize particles which are dispersed throughout the polymer matrix. The polymeric material is usually utilized as the fabrication material for an aseptic container, however a multitude of other uses exist for the modified polymeric material.

The method for producing the polymeric material integrated with a metal catalyst which promotes the degradation of a sterilant comprises the steps of adding the metal catalyst to a precursor compound for the polymeric material, then reacting the modified precursor compound with an additional precursor compound for polymerization to the polymeric material integrated with a metal catalyst. The method may further comprise molding the polymeric material into a container configuration, sterilizing the container with a sterilant such as hydrogen peroxide or ozone, and filling the container with a desired contents. If the polymeric material is PET, COPET or a mixture thereof, then an additional step of reacting a dicarboxylic acid with a dihydroxy compound to form a monomer solution may be employed prior to adding the metal catalyst.

Another method of the present invention comprises the steps of reacting at least one precursor compound to form a monomer solution, polymerizing the monomer solution into a polymeric material, adding the metal catalyst to the polymeric material to form a high metal concentration polymeric material, and mixing this polymeric material with the unmodified polymeric material to form a polymeric material integrated with a metal catalyst. If the polymeric material is PET, then the precursor materials may be either terephthalic acid or dimethyl terephthalate, and ethylene glycol which react to form the monomer solution. The method may further comprise molding the polymeric material into a container configuration, sterilizing the container with a sterilant such as hydrogen peroxide, benzoyl peroxide or ozone, and filling the container with a desired contents.

Still another method of the present invention comprises the steps of manufacturing a polymeric resin and applying a metal catalyst to the polymeric resin. The method may further comprise molding the polymeric material into a container configuration, sterilizing the container with a sterilant such as hydrogen peroxide or ozone, and filling the container with a desired contents. If the polymeric resin is converted to a container configuration prior to applying the metal catalyst, then application of the metal catalyst may proceed by either of the following steps: rinsing the polymeric resin with a solution containing the metal catalyst for a sufficient amount of time to allow for impregnation of the metal catalyst into the polymeric resin; or applying the metal catalyst through a deposition technique selected from the group consisting of organo-metallic chemical vapor deposition, RF magnetron sputtering, ion beam deposition, plasma enhanced deposition and electron beam deposition. If the metal catalyst is applied before conversion to the container configuration, then application of the metal catalyst may proceed by immersing the polymeric resin in a solution containing the metal catalyst for a sufficient time to allow for coating of the polymeric resin. Then, the coating is allowed to dry on at least one surface of the polymeric resin.

The present invention is also embodied in an aseptic container sterilized by a sterilant and fabricated to degrade substantially all of the sterilant which has diffused into and is present on the surface of interior walls of the aseptic container. The aseptic container is comprised of at least one layer composed of a polymeric material and a metal catalyst integrated with polymeric material. The layer forms the boundary of the aseptic container and has an exterior surface and an interior surface.

A preferred polymeric material for the aseptic container is polyethylene terephthalate and the metal catalyst of the metal catalyst film may be selected from the group consisting of iron, cobalt, nickel, ruthenium, palladium, osmium, iridium, platinum, copper, manganese, salts thereof, oxides thereof and mixtures thereof. Usually the metal catalyst will be less than ten percent of the total weight of the aseptic container, however greater weight percentages may be employed in creating the aseptic container. The typical sterilant to be degraded is hydrogen peroxide, however the present invention is capable of degrading other sterilants. The metal catalyst may be integrated with the polymeric resin through any of the above-mentioned methods. The aseptic container may be a monolayer or a multilayer container.

Having briefly described this invention, the above and further objects, features and advantages thereof will be recognized by those skilled in the art from the following detailed description of the preferred embodiments of the invention as illustrated in the accompanying drawings.

BRIEF DESCRIPTION OF THE DRAWINGS

Several features of the present invention are further described in connection with the accompanying drawings in which:

There is illustrated in FIG. 1 a flow diagram of one embodiment of the process for the present invention.

There is illustrated in FIG. 2 a flow diagram of an alternative embodiment of the process for the present invention.

There is illustrated in FIG. 3 a flow diagram of an alternative embodiment of the process for the present invention.

There is illustrated in FIG. 4 a side perspective of one embodiment of the present invention.

There is illustrated in FIG. 5 a flow diagram of a process for manufacturing aseptic containers utilizing the present invention.

DETAILED DESCRIPTION OF THE PREFERRED EMBODIMENTS

The present invention is a polymeric material integrated with a metal catalyst which promotes the degradation of a sterilant. In a preferred embodiment, the polymeric material is polyethylene terephthalate ("PET") which is a linear saturated polyester of high molecular weight. COPET may be utilized, or even mixtures of COPET and PET. However, others skilled in the art will be familiar with other polymeric materials applicable to the present invention. The present invention is able to promote the degradation of sterilants without affecting the transparency of the polymeric material, or the other desirable properties of the polymeric material.

The metal catalyst used for integration may include iron, cobalt, nickel, ruthenium, palladium, osmium, iridium, platinum, copper, manganese, salts thereof, oxides thereof and mixtures thereof. However, those skilled in the art will be familiar with other catalyst applicable to the present invention. A preferred metal catalyst may be nanosize particles which as mentioned previously, may have increased aspect ratios. An aspect ratio is the ratio of a particular object's width to its thickness. The nanosize particles will also reduce the permeability of the polymeric material to various gases such as oxygen. The nanosize particles usually have dimensions in the nanometers, hence the designation "nanosize particles." Microsize particles may also be employed in practicing the present invention. The microsize particles will have similar properties to those of the nanosize particles. The metal catalyst is approximately less than ten percent of the total weight of the polymer material no matter which size of particle is utilized in practicing the present invention. A preferred weight percentage is less than one percent of the polymeric material. Integrating the metal catalyst into the polymer material may occur through numerous methods. Three general integration methods for the present invention are set forth below.

PET and COPET may be prepared from either of two general processes: 1) the dimethyl terephthalate ("DMT") process and 2) the terephthalic acid ("TA") process. The preparation of PET by the DMT process proceeds through two successive ester interchange reactions. In an ester interchange reaction, the alcohol residue of an ester is replaced by another alcohol residue by treating the ester with alcohol. In the first ester interchange reaction, dimethyl terephthalate (a dicarboxylic acid) is heated with an excess of ethylene glycol (a dihydroxy compound) at 150–210° C. in the presence of a catalyst (the molar ratio is 1:2.1–2.2). The ester interchange occurs as follows with the principal product being bis(2-hydroxyethyl) terephthalate:

In the second ester interchange, after the methanol is distilled off, the bis(2-hydroxyethyl) terephthalate serves as both the ester and the alcohol for the reaction. The bis(2-hydroxyethyl) terephthalate is heated at 270–285° C. with continuous evacuation to pressures below 1 mm Hg. Successive interchanges result in the formation of the polyester, PET, which is polymerized until an average molecular weight of about 20,000 is reached and then the molten polymer is extruded from the reactor and disintegrated. The PET has the general formula:

The preparation of PET by the TA process proceeds through a direct esterification reaction. The terephthalic acid (a dicarboxylic acid) is reacted with ethylene glycol (a dihydroxy compound) in a molar ratio of 1 to 1.5, at a pressure range of approximately 5 psia to 85 psia, and at a temperature range of approximately 185 to 290° C. for approximately 1 to 5 hours. The products formed are the monomer and water which is removed as the reaction proceeds. Next, the polymerization of the monomer occurs at a pressure range of 0 to 40 mm Hg at a temperature range of about 205 to 305° C. for approximately 1 to 4 hours which results in the formation of the PET resin.

PET and COPET are made by dicarboxylic acid compounds and dihydroxy compounds. As described above, PET is the product of a reaction between terephthalic acid and ethylene glycol. COPET is the product of a reaction of a substitution of either the terephthalic acid or dimethyl terephthalate (the dicarboxylic acid compound) and ethylene glycol (the dihydroxy compound) which may also be substituted for by another dihydroxy compound. The substitution may be either a partial or a full substitution of either of the compounds. The possible substitutes for the dicarboxylic acid compound include the following: dimethyl terephthalic acid; isophthalic acid; adipic acid; sebacic acid; azelaic acid; decanedicarboxylic acid; naphthalenedicarboxylic acid; diphenyldicarboxylic acid; and diphenoxyethanedicarboxylic acid. The possible substitutes for the dihydroxy compound include the following: diethylene glycol; triethylene glycol; trimethylene glycol; tetramethylene glycol; hexamethylene glycol; propylene glycol; neopentyl glycol; 1,3 bis (2 hydroxyethoxy) benzene; 1,4 bis (2 hydroxyethoxy) benzene; bis( 2-hydroxyethyl) dimethylmethane; bis(4-beta-hydroxyethoxyphenyl)sulfone; cyclohexanedimethanol; cyclohexanediethanol; and cyclohexanedipropanol. The reactions for producing the COPET is similar to the reactions for forming the PET. The reactions may also be used to produce a blend of PET and COPET. When referring to a mixture of PET and COPET, the mixture may be a blend of PET and COPET, or PET and COPET produced through separate reactions then admixed to form the mixture.

Once the polymer material integrated with a metal catalyst is formed (as explained below), an aseptic container may be fabricated through a number of molding methods well known in the packaging industry. Although the novel container of the present invention substantially degrades sterilants residing in the walls of the container, the novel container may be fabricated using substantially the same molding methods as are used for standard containers.

Three general methods for manufacturing containers from a PET resin are extrusion molding, injection molding and thermoformiing. One of the extrusion methods is extrusion blow molding wherein the parison is extruded and blow molded to the final bottle configuration. Another method is extrusion stretch blow molding wherein the parison is extruded and cooled to wall temperature range of approximately 90–125° C., then blow molded to the final bottle configuration. Still another method is two stage extrusion stretch blow molding wherein the parison is first extruded and cooled to room temperature. Then, the parison is transported to a separate operation where it is reheated to a wall temperature of 90–125° C. and then blow molded to the final bottle configuration.

One of the injection methods is injection blow molding wherein a parison is injected molded and then the hot parison is blow molded to the final container configuration. Yet another injection method is injection stretch blow molding wherein a parison is injection molded and cooled to a wall temperature of 90–125° C. before being stretch blow molded to the final container configuration. A final method is two stage injection stretch blow molding wherein a parison is injection molded and cooled to room temperature. Then, it is transported to a separate operation where it is reheated to a wall temperature of 90–125° C. and then stretch blow molded to the final container configuration.

Thermoforming is a low pressure process that converts flat, basically two-dimensional thermoplastic sheet stock into larger, generally more complex three dimensional containers. The thermoforming process begins with sheets that are cut to size, then loaded and clamped into a thermoforming machine. The sheet is then heated to a softening temperature and formed into a container. The containers are cooled, unloaded from the machine and trimmed to remove any extra material.

A preferred method of fabricating the novel container is through two-stage injection stretch blow molding, however any of the previously mentioned molding processes will suffice to fabricate the container embodied by the present invention.

Sterilants become easily entrapped in the amorphous zones of the molded PET or COPET containers. Amorphous zones are usually located where the stretch ratio is low. In extrusion blow and injection blow molded containers, it is possible that the entire container may be amorphous. However, in extrusion and injection stretch blow molded containers, the amorphous zones are usually located only in the neck and bottom parts of the containers where the stretch ratio is the lowest.

Figure 1:
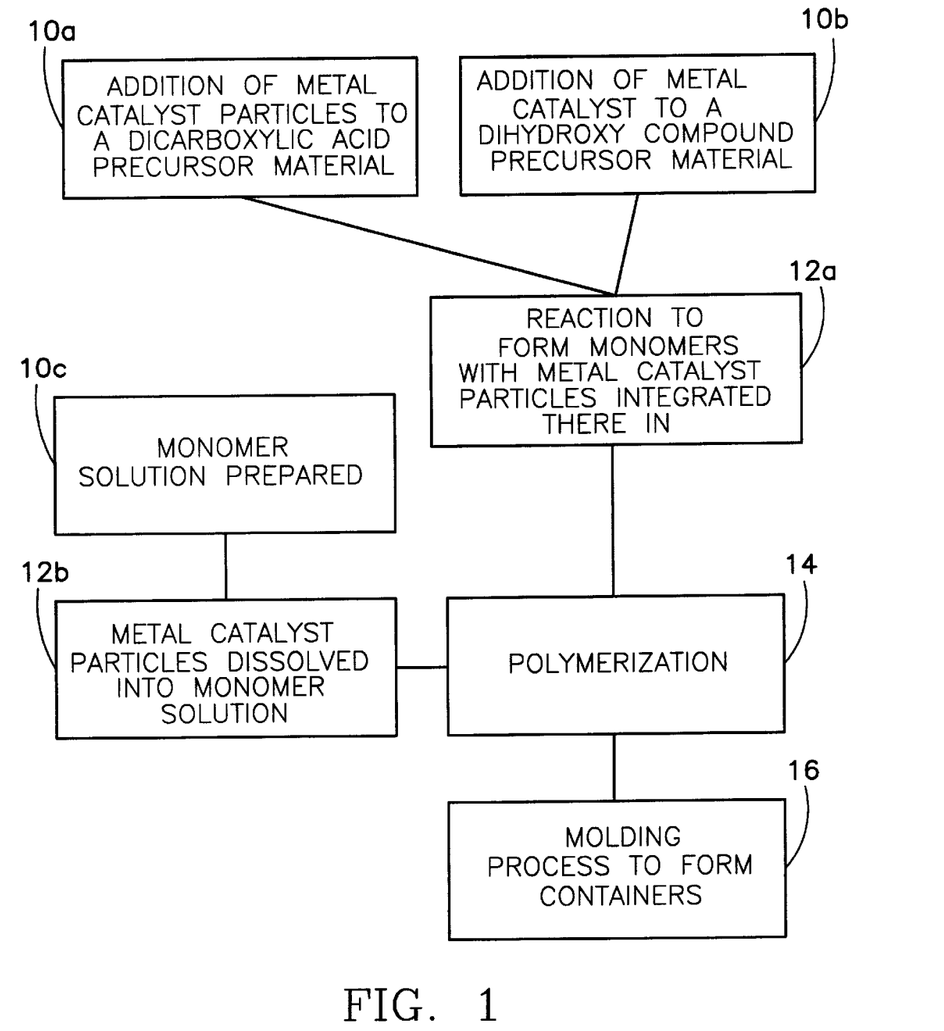

There is illustrated in FIG. 1 a flow diagram for a process for one embodiment of the present invention. As shown in FIG. 1, this first method of integration occurs before and during polymerization of the polymeric material. Although the process described in FIG. 1 is directed toward PET (and generally COPET) as the polymer material, those skilled in the pertinent art will recognize that the process may easily be adapted for the integration of other polymer materials. At step 10*a* and step 10*b*, nanosize or microsize particles of the metal catalyst are added to the precursors materials (terephthalic acid and ethylene glycol) before the polymerization process to form a modified precursor material. The metal particles should be nanosize or microsize particles in order to have a minimal affect on the transparency of the PET. At step 12*a*, the modified precursor materials are reacted to form the modified pre-PET monomer. Using the TA process, step 12*a* is a direct esterification reaction. An alternative pathway to obtain the modified pre-PET monomer occurs through step 10*c* where the monomer solution is prepared through a direct esterification reaction using non-modified precursor materials. Then at step 12*b*, the metal catalyst or a metal compound thereof is dissolved into the monomer solution, before the polymerization process, to form the modified pre-PET monomer. At step 14, the modified pre-PET monomer is polymerized to form the blended PET resin. At step 16, the blended PET resin is converted to the final container configuration.

Figure 2:
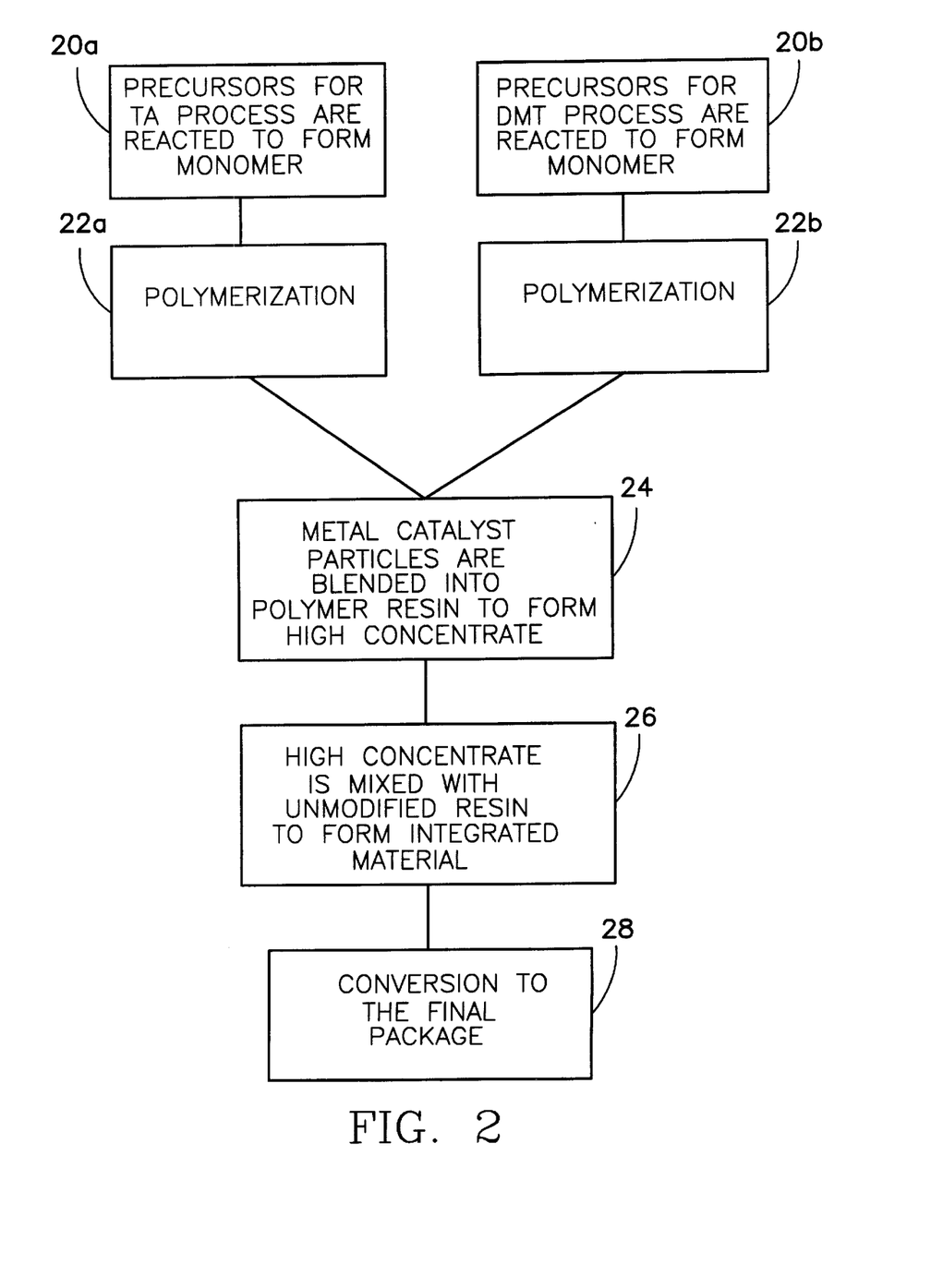

There is illustrated in FIG. 2 a flow diagram of an alternative embodiment of the process for the present invention. As shown in FIG. 2, the second method of integration occurs before or during the conversion of the PET resin into the final package design. Although the process described in FIG. 2 is directed toward PET (and generally COPET) as the polymer material, those skilled in the pertinent art will recognize that the process may easily be adapted for the doping of other polymer materials. The second method of integration may begin through two different pathways. In step 20*a*, the precursor materials for the TA process are reacted to form the monomer solution. In step 20B, the precursor materials for the DMT process undergo the first esterification reaction. In steps 22*a* and 22*b*, polymerization occurs to form a PET resin. In step 24, metal catalyst particles are blended into the PET resin which results in a PET compound with a high metal concentration. The blending of the particles may be performed through use of a twin screw extruder. In step 26, this high concentration compound is then added to a larger amount of unmodified PET resin before conversion to the final package. At step 26, a COPET resin may be substituted for the unmodified PET resin to form a blended PET material. In step 28, the PET resin, including the high concentration compound, is converted to the final container configuration. The conversion of the PET resin to the final container configuration also assists in blending and dispersing the high concentration compound throughout the PET resin, and ultimately the container.

Figure 3:
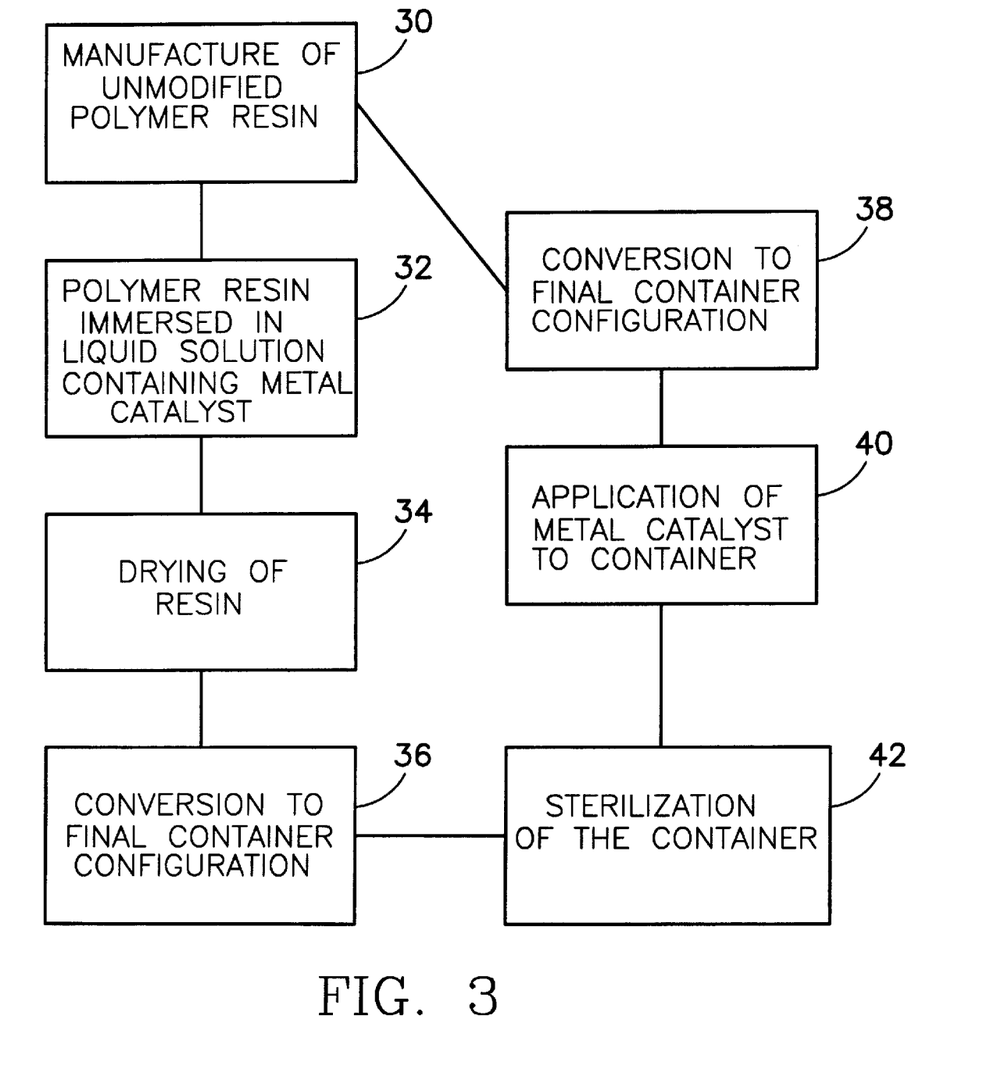

There is illustrated in FIG. 3 a flow diagram of an alternative embodiment of the process for the present invention. As is shown in FIG. 3, the third method of integration occurs through the absorption/adsorption of a metal complex to the PET surface. Although the process described in FIG. 3 is directed toward PET (and generally COPET) as the polymer material, those skilled in the pertinent art will recognize that the process may easily be adapted for the doping of other polymer materials. The third method of integration may occur through alternative pathways. In step 30, the PET resin is manufactured using either the TA process or the DMT process. In step 32, the resulting PET resin is immersed in a liquid solution containing the metal catalyst. The metal catalyst is contained within a metal salt which is part of a water based liquid solution. The PET resin is immersed in the liquid solution allowing for the absorption of metal salt into the PET resin. In step 34, the modified PET resin is dried for a predetermined period of time. In step 36, the modified PET resin is then converted into the final container configuration.

In an alternative pathway, after the manufacture of the PET resin at step 30, the unmodified PET resin is converted to its final container configuration at step 38. At step 40, the metal catalyst is applied to the interior of the final container. Application of the metal catalyst at step 40 may be achieved through several methods. First, instead of a metal salt, the metal catalyst may be in a solution as a highly hydrophilic metal compound. In this form, the solution is washed upon the surface of the final container in a rinsing operation before treatment with the sterilant at step 42, thereby allowing the highly hydrophilic metal compound to impregnate and be absorbed by the PET surface of the interior of the final container. The excess highly hydrophilic metal compound may then be removed through contact with a water based liquid. An alternative method of application may be through deposition of the metal catalyst onto the interior surface of the final container. The deposition method may be through a physical vapor deposition (PVD) method or a chemical vapor deposition (CVD) method. Possible PVD methods include RF magnetron sputtering, ion beam deposition, plasma enhanced deposition and electron beam deposition. A suggested CVD method is organo-metallic chemical vapor deposition (OMCVD). After application of the metal catalyst to the interior surface of the container, the container is sterilized at step 42.

Figure 4:
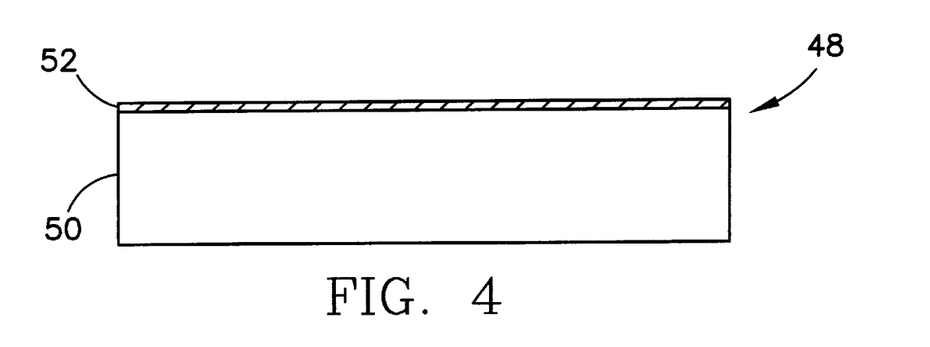

There is illustrated in FIG. 4 a side perspective of one embodiment of the present invention. As shown in FIG. 4, a laminate is generally designated 48 and is composed of a polymeric material 50 and a thin film 52. The laminate 48 is produced by the method disclosed in FIG. 3. The polymeric material 50 may or may not contain a sterilant residue. In a preferred embodiment, the polymeric material 50 is suitable as a packaging material for aseptic containers. The thin film 52 is the metal catalyst coating which is applied to the polymeric material 50 on what will become the interior surface of the aseptic container. If the polymeric material 50 does contain a sterilant residue, this residue will be degraded to harmless compounds by metal catalyst particles from the thin film 52 which have diffused into the polymeric material 50.

Figure 5:
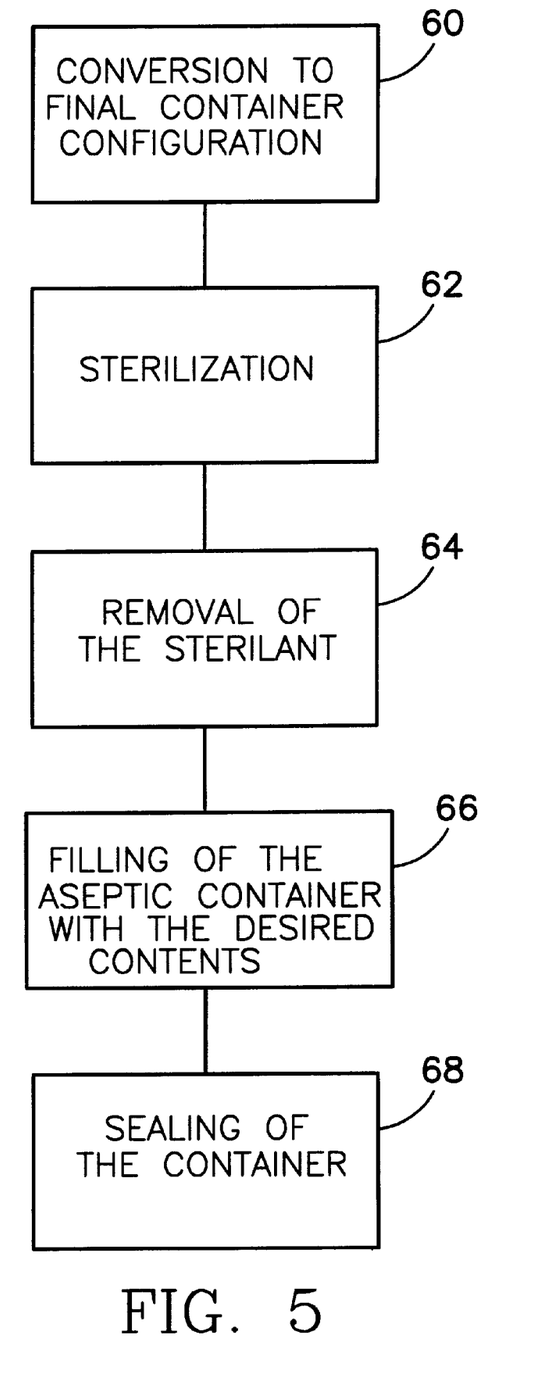

There is illustrated in FIG. 5 a flow diagram of a process for manufacturing aseptic containers utilizing the present invention. As shown in FIG. 5, the packaging material is formed to the container configuration at step 60. Also at step 60, the metal catalyst degradation component is applied to the interior of the container if the packaging material does not already contain the degradation component. At step 62, the container is sterilized with a sterilant which may be hydrogen peroxide, benzoyl peroxide or ozone. The container is sterilized for a predetermined residence time depending on the sterilant and the method utilized to apply the sterilant. In a preferred embodiment, the sterilant is hydrogen peroxide applied to the container for three seconds in its vapor phase at a temperature over 152.2° C. Although vapor phase application of a sterilant allows a greater amount of the sterilant to permeate through and become entrapped in the container walls, such application is available using the present invention because substantially all of the sterilant which may permeate into the container walls will be degraded by the present invention into harmless by-products. Thus, it is clearly evident that the present invention will tremendously expedite the sterilization process for aseptic containers, not only for the food packaging industry but in many other industries. Other sterilant application methods are available using the present invention including application of the sterilant in its liquid phase.

Returning to the discussion of FIG. 5, at step 64 the sterilant is removed from the container. If a vapor phase application has been utilized, the sterilant is easily evacuated by normal air pressure. If a liquid phase application is utilized, the container is rinsed with water to remove the bulk of the sterilant. At step 66, the now aseptic container is filled with the desired contents such as orange juice or milk, and aseptically sealed at step 68 and prepared for distribution to the marketplace.

Although the flow diagram of FIG. 5 specifically describes a process for manufacturing aseptic containers for the packaging of foods, those skilled in the pertinent art will recognize that the process may easily be adapted for packaging industrial materials in medical, electronic, chemical and mechanical fields such as blood transfusion packs, semiconductor packages, oxidative chemicals packages, precision parts packages and the like. Thus, the present invention may have application in various forms in a wide variety of fields.

From the foregoing it is believed that those skilled in the art will recognize the meritorious advancement of this invention and will readily understand that while the same has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

I claim as my invention:

1. A stretch blow molded aseptic container for a liquid food product, the container sterilized by hydrogen peroxide prior to filling with the liquid food product and fabricated to degrade all of the hydrogen peroxide which may diffuse into the amorphous zones of the stretch blow molded aseptic container itself, the amorphous zones comprising the neck of the container, the aseptic container comprising:

at least one layer composed of polyethylene terephthalate, the at least one layer forming a boundary of the aseptic container, the at least one layer having an exterior surface and an interior surface, the interior surface in contact with the hydrogen peroxide; and an iron oxide catalyst integrated into the polyethylene terephthalate to form an intimate mixture of polyethylene terephthalate and iron oxide, the iron catalyst consisting of a plurality of nanosize particles comprising approximately 0.01 to 1.0 percent of the weight of the at least one layer composed of polyethylene terephthalate;

whereby the iron catalyst degrades all of the hydrogen peroxide which diffuses into the amorphous zones of the aseptic container.

* * * * *